United States Patent [19]

Piero

[11] Patent Number: 5,792,990
[45] Date of Patent: Aug. 11, 1998

[54] COUPLING FOR METAL TUBES

[75] Inventor: Bertoldo Piero, Balangero, Italy

[73] Assignee: Bertoldo & C. S.r.l., Turin, Italy

[21] Appl. No.: 54,907

[22] Filed: Apr. 29, 1993

[30] Foreign Application Priority Data

Apr. 3, 1992 [IT] Italy .................... TO92A0374

[51] Int. Cl.$^6$ .................... H02G 3/06; H02G 3/08; F16F 55/00
[52] U.S. Cl. .................... 174/86; 285/177; 285/304; 403/220
[58] Field of Search .................... 174/86, 35 R, 174/35 MS, 59, 65 R, 17.05, 77 R; 285/9.1, 9.2, 139, 141, 142, 235, 238, 244, 249, 267, 302, 318, 336, 342, 343, 379, 902, 910, 917, 918, 81, 177, 304; 403/220, 229, 292

[56] References Cited

U.S. PATENT DOCUMENTS

| | | | |
|---|---|---|---|
| 1,800,254 | 4/1931 | Holmes | 403/229 X |
| 2,058,062 | 10/1936 | Cowles | 285/9 |
| 2,425,500 | 8/1947 | Wiggins | 285/158 X |
| 2,506,447 | 5/1950 | Griener | 174/86 |
| 2,900,436 | 8/1959 | Appleton | 174/86 |
| 2,966,539 | 12/1960 | Sears et al. | 174/17 |
| 3,093,703 | 6/1963 | Zavertnik | 174/86 |
| 3,166,345 | 1/1965 | Pinuard | 285/142 X |
| 3,186,736 | 6/1965 | Warshaursuy | 174/86 X |
| 3,296,361 | 1/1967 | Maruland et al. | 174/86 |
| 3,783,178 | 1/1974 | Philibert et al. | 174/86 |
| 3,884,508 | 5/1975 | Jones | 285/902 X |
| 3,907,334 | 9/1975 | Schera, Jr. | 174/86 X |
| 4,072,328 | 2/1978 | Elliot | 285/302 X |
| 4,082,326 | 4/1978 | Bryson | 285/238 |
| 4,434,541 | 3/1984 | Powers, Jr. | 428/570 X |
| 4,613,172 | 9/1986 | Schattmaier | 285/902 X |
| 5,248,850 | 9/1993 | Laney | 174/65 R |
| 5,307,037 | 4/1994 | Woods et al. | 335/216 |
| 5,355,909 | 10/1994 | Smith, III | 285/917 X |

FOREIGN PATENT DOCUMENTS

| | | | |
|---|---|---|---|
| 468162 | 10/1946 | Belgium . | |
| 4240279 | 9/1994 | Germany | 285/902 |

*Primary Examiner*—Hyung S. Sough
*Attorney, Agent, or Firm*—Trask, Britt & Rossa

[57] ABSTRACT

A coupling includes a metal body having a cavity for receiving the end of a tube. The coupling has an electrically conductive, resilient member which is in electrical contact with the metal body and one part of which is intended to exert a resilient force on the outer surface of the tube so as to establish electrical contact with the tube.

10 Claims, 3 Drawing Sheets

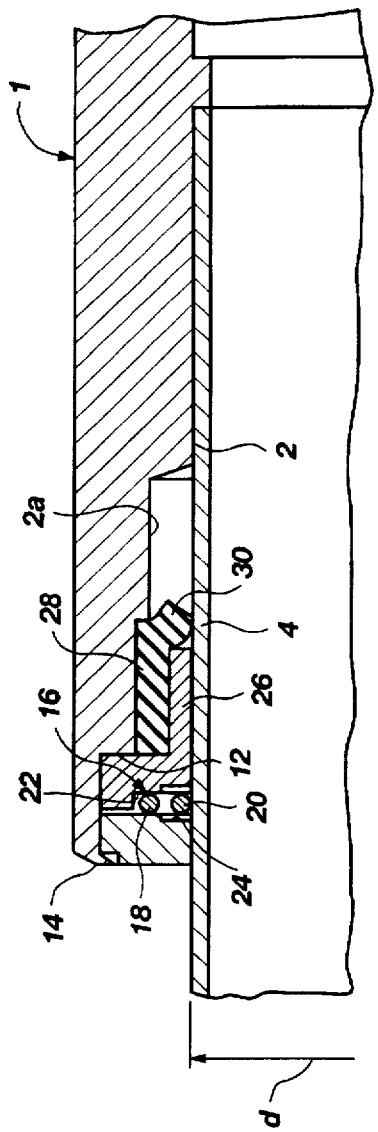
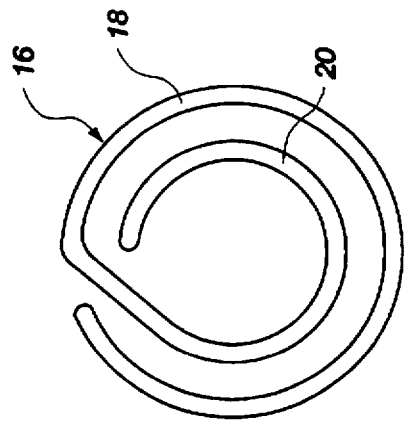
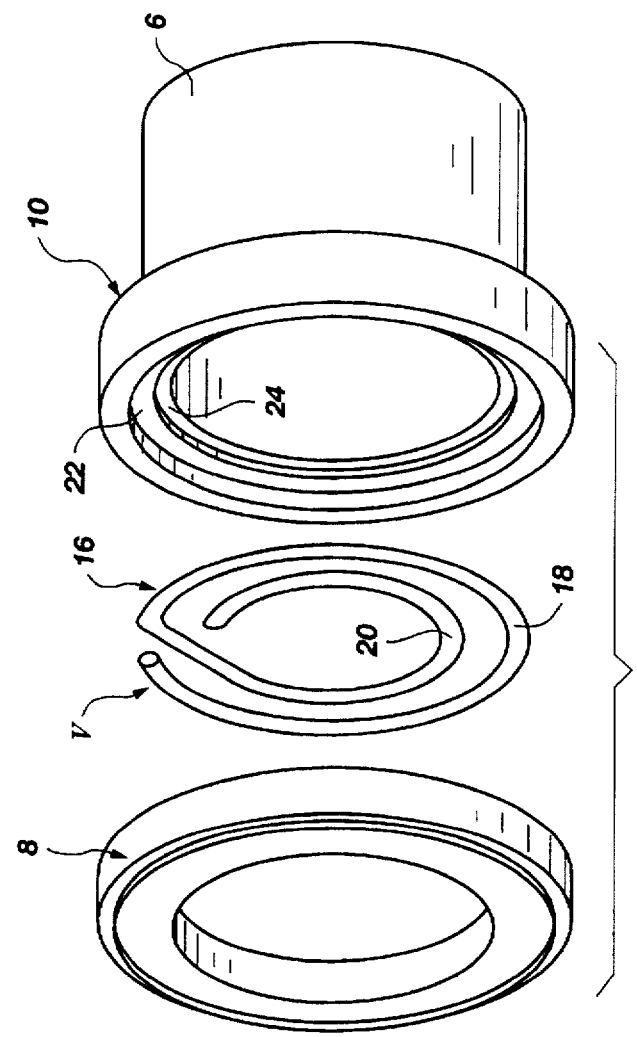
Fig. 3
Fig. 5
Fig. 4

COUPLING FOR METAL TUBES

BACKGROUND OF THE INVENTION

1. Field of the Invention

The present invention relates to a coupling for metal tubes, particularly for tubes for protecting electrical systems, of the type comprising a metal body having a cavity for receiving the end of a tube.

2. Statement of the Art

For safety reasons, metal tubes (tubes for protecting electrical systems, tubes for distributing fluids such as water, compressed air, etc.) must be connected electrically to earth over the entire length of the tubing.

Hence, in the formation of couplings between various lengths of metal tubes, it is necessary to ensure the continuity of the electrical equipotential across the coupling zones.

Usually the metal tubes are connected together by threaded sleeves. This type of connection is able to establish the electrical continuity but makes it complicated to achieve the connection since the ends of the tubes must be threaded in situ, after the tubes have been cut to length and the threaded sleeves must be assembled by means of tightening tools. Moreover, in the case of tubes which have an anti-oxidising protective surface treatment (zinc or copper plating etc.), the threading of the ends removes the protective layer and the zone of coupling of the tubing is exposed to corrosion which may make the electrical connection uncertain.

Couplings have already been proposed which have an auxiliary metal member which establishes the electrical contact between the tube and the body of the coupling.

For example, BE-A-468162 describes a coupling having a metal ring which is pressed against the outer surface of the tube by means of the tightening of a threaded ring nut. In this case, the electrical contact between the body and the tube of the coupling is ensured solely by a manual screwing operation. Any vibrations or insufficient tightening could compromise the electrical continuity.

U.S. Pat. No. 2,966,539, U.S. Pat. No. 3,783,178 and U.S. Pat. No. 4,082,326 illustrate couplings having one or more metal members which are pressed against the surface of the tube by the resilient force produced by an elastomeric body. These couplings do not ensure the electrical continuity after some time or after repeated assembly and dismantling since the elastomeric material cannot maintain its elastic characteristics.

U.S. Pat. No. 3,093,703 illustrates a telescopic sleeve for the coupling of threaded tubes which does not enable rapid coupling with non-threaded tubes. The electrical contact is achieved by means of an octagonal metal ring whose sides press against the outer surface of an inner sleeve and whose corners press against the inner surface of an outer sleeve.

SUMMARY OF THE INVENTION

The object of the present invention is to provide a coupling which is simple and economical and which enables the electrical connection between the various sections of tubing to be effected with certainty, without requiring tightening operations.

In the coupling of the invention, the electrical connection between the tube and the metal body is achieved automatically with the insertion of the tube into the cavity in the body, without any need to carry out additional operations.

The elastic member does not cut into the protective coating of the tube and if the surface of the tube has traces of grease or dirt the elastic member, by sliding over the surface of the tube, has a cleaning effect which is advantageous as regards the electrical continuity.

The coupling according to the invention is preferably provided with a washer of elastomeric material adapted to establish sealing contact between the tube and the body.

In this manner, with the simple insertion of the tube in the cavity in the body—which is effected manually without the use of tools—an equipotential and sealing connection is achieved even should the tube be slightly oval in shape.

BRIEF DESCRIPTION OF THE DRAWINGS

Other characteristics and advantages of the present invention will become clear during the detailed description which follows, given with reference to the appended drawings, provided purely by way of non-limiting example, in which:

FIG. 3 is a section similar to FIG. 1 illustrating the coupling coupled to a tube, FIG. 4 is an exploded perspective view of several components of the coupling of the invention.

FIG. 5 is a plan view of the element indicated by the arrow V in FIG. 4, and

DETAILED DESCRIPTION OF THE ILLUSTRATED EMBODIMENTS

Figure 1:
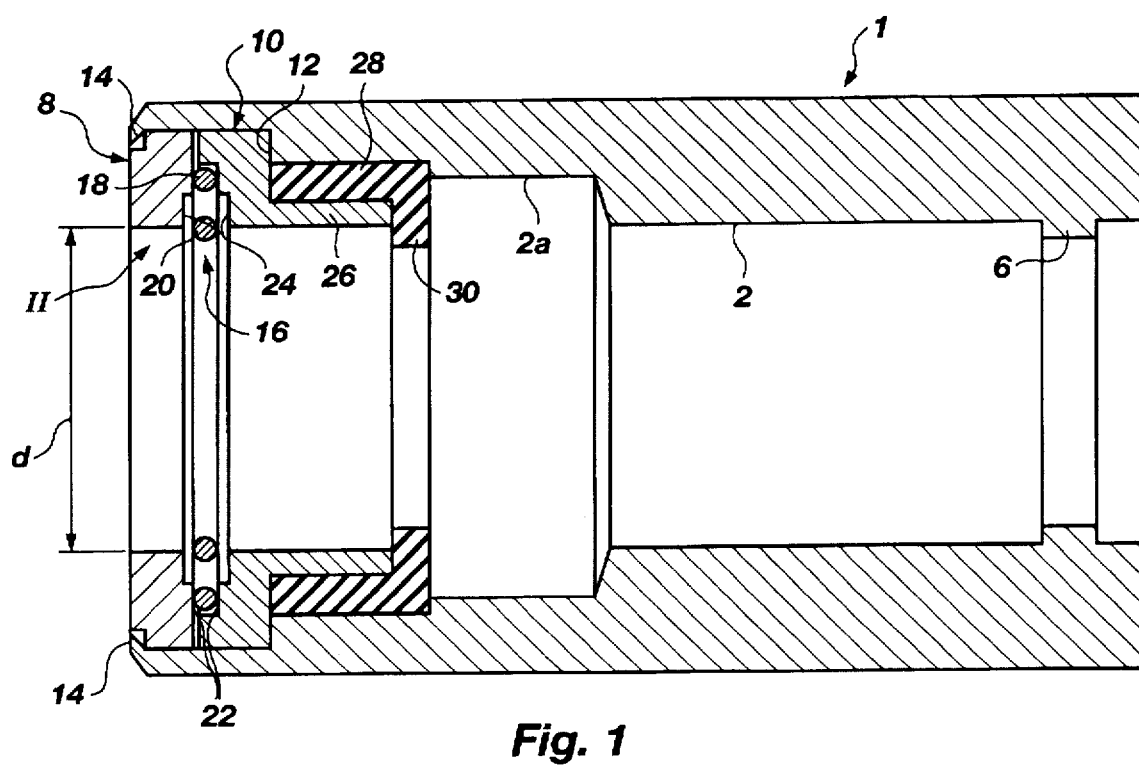
FIG. 1 is an axial section of a coupling of the present invention.

With reference to the drawings, a metal body indicated 1 is formed with a cavity 2 intended to receive an end portion of a metal tube 4 (see FIG. 3). A shoulder 6 is formed in the cavity 2 for abutment by the front end of the tube 4.

To one end of the body 1 are fixed two rings 8,10 whose internal diameters, indicated d, are substantially equal to the diameter of the tube 4. The dimensional tolerances in the outer diameter of the tube 4 and in the inner diameter of the rings 8, 10 are such that the tube 4 can be inserted without interference with the rings 8, 10 or with the walls of the cavity 2.

The ring 10 is forced axially against a shoulder 12 formed in the body 1 while the ring 8 is forced against the ring 10 by an inwardly turned edge 14 of the body 1 which fixes the rings 8, 10 to the body 1.

Between the rings 8, 10 there is a resilient member 16 constituted by a metal wire shaped into a generally spiral configuration.

As seen in greater detail in FIGS. 4 and 5, the member 16 has two concentric, coplanar circular arms indicated 18 and 20.

Figure 2:
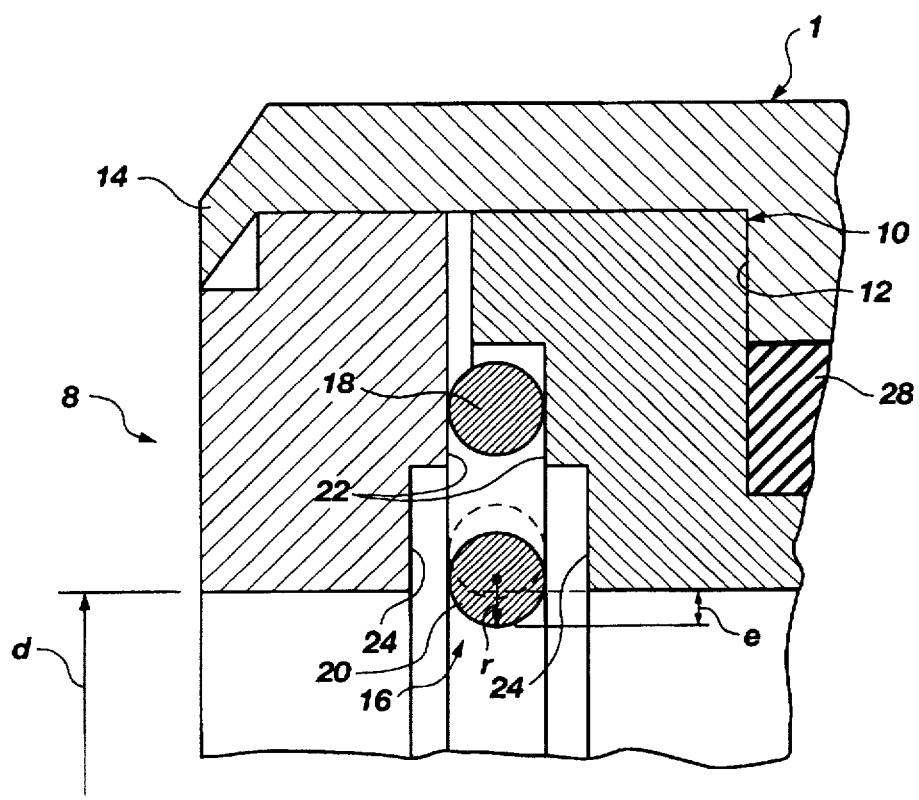
FIG. 2 is a section of the part indicated by the arrow II in FIG. 1 on an enlarged scale.

As seen in particular in FIG. 2, the rings 8, 10 together define a seat which has a radially outer chamber 22 and a radially inner chamber 24. The outer arm 18 of the resilient member 16 is gripped between the rings 8, 10 in the chamber 22 while the inner arm 20 is free to expand radially in the chamber 24 since the axial dimension of the latter is greater than the diameter of the wire constituting the member 16.

With reference to FIG. 2, the inner arm 20 of the resilient member 16 projects radially into the cavity 2 by distance e which is less than the radius r of the wire constituting the member 16. This ensures that the inner arm 20 deforms radially outwardly during the insertion of the tube without causing the tube to jam against the arm 20 even when the end of the tube 4 has a sharp edge.

The ring 10 has an axial seal appendage 26 onto which is fitted an elastomeric sealing member 28. The sealing member 28 has an annular projection 30 which extends into the cavity 2 and is intended to establish sealing contact with the outer surface of the tube 4 (see FIG. 3). In correspondence with the projection 30 of the washer 28, the cavity 2 has a part 2a with a greater diameter than that of the tube 4 so as to allow the projection 30 to deform axially (see FIG. 3 again).

When the tube 4 is inserted in the cavity 2 as illustrated in FIG. 3, the inner arm 20 of the elastic member 16 exerts a radially compressive resilient force on the external sidewall surface of the tube 4 which ensures the electrical connection between the member 16 and the tube 4.

The member 16 is in turn connected electrically to the metal body 1 by means of the rings 8, 10.

At the same time, the sealing member 28 with its projection 30 establishes sealing contact between the tube 4 and the body 1.

The end of the body 1 which is not illustrated in the drawings may be made in a similar manner to that described previously or alternatively may be provided with means for fixing the body 1 to a connector block or the like.

Figure 7:
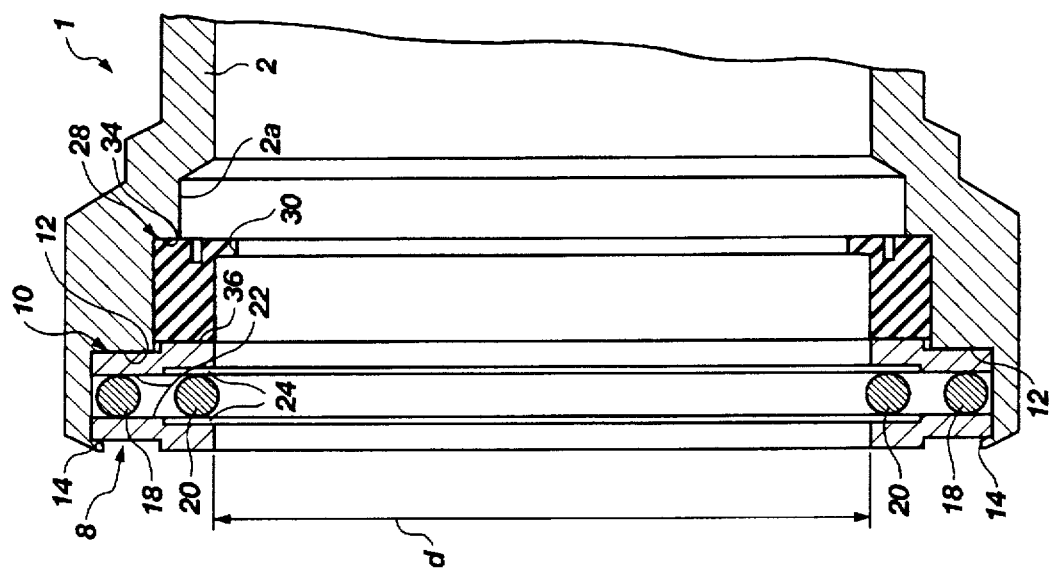
FIG. 6 and FIG. 7 are axial sections illustrating two variants of the coupling of the invention.
Figure 6:
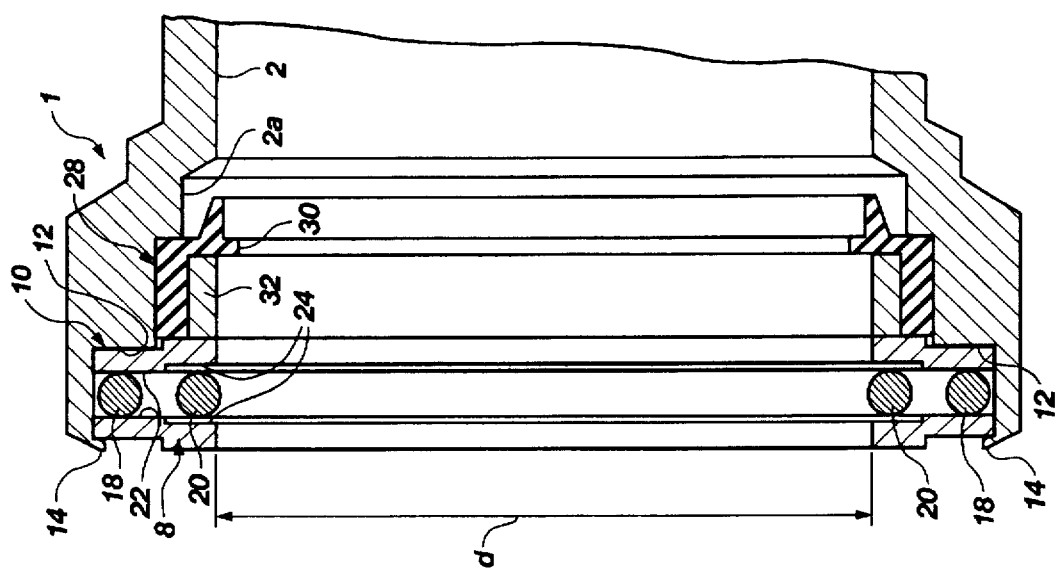

In the variants illustrated in FIGS. 6 and 7, in which elements corresponding to those described previously are indicated by the same reference numerals, the rings 8, 10 are each constituted by a relatively thin disc subjected to a drawing process so as to obtain two offset surfaces which, together with the surfaces of the opposing disc, constitute the walls of the chambers 22 and 24.

In the version of FIG. 6, the sealing member 28 is fitted onto a metal reinforcing member 32 while, in the version of FIG. 7, the sealing member 28 is simply retained between a shoulder 34 of the body 1 and the surface 36 of the ring 10.

In the variant of FIG. 7, the sealing member 28 has an inner diameter equal to the inner diameter d of the rings 8, 10 and preferably has a notch 38 which facilitates the deformation of the projection 30 during insertion of the tube.

I claim:

1. A coupling for a metal tube, in particular for a tube for protecting electrical systems, comprising a metal body having a cavity for receiving an end of the tube, and an electrically-conductive resilient member for establishing an electrical contact between the metal body and the tube, the electrically conductive resilient member having a substantially spiral form with an outer arm fixed to and in electrical contact with the metal body and an inner arm positioned to exert a radially compressive force on the external sidewall surface of the tube, the electrically-conductive resilient member being housed in a seat having a radial outer chamber in which the outer arm of the resilient member is clamped between two radial surfaces and a radial inner chamber located in correspondence with the inner arm of the electrically-conductive resilient member, wherein an axial dimension of said inner chamber is greater than the thickness of the electrically-conductive resilient member.

2. A coupling according to claim 1, wherein a portion of the resilient member for establishing the electrical contact with the tube has a circular profile with an inner diameter less than the outer diameter of the tube to be received so that, in use, the said portion can expand radially as a result of the introduction of the tube.

3. A coupling according to claim 1, wherein the electrically-conductive resilient member is formed from a circular-section wire which, in its undeformed configuration, projects radially into the cavity for receiving the tube by an amount less than the radius of the circular-section wire.

4. A coupling according to claim 1, including a sealing member of elastomeric material able to establish sealing contact between the tube and the metal body.

5. A coupling according to claim 1, wherein said seat is defined between two metal rings fixed to said metal body.

6. A coupling according to claim 5, wherein one of the said two metal rings has an axial appendage onto which a sealing member is fitted, said sealing member having an annular projection projecting radially into the cavity and intended to adhere to the outer surface of the tube.

7. A coupling for a metal tube, in particular for a tube for protecting electrical system, said coupling comprising:

a metal body defining a cavity adapted to receive an end of said tube; and an electrically conductive resilient member having a substantially spiral configuration including a radial outer arm and a radial inner arm, wherein said arms are substantially coplanar and said radial outer arm is fixed and in electrical contact with the metal body and said radial inner arm, in an undeformed configuration, projects radially into said cavity; the resilient member is formed from a circular-section wire which, in said undeformed configuration, projects radially into said cavity by an amount less than the diameter of the circular-section wire, wherein the electrically-conductive resilient member is housed in a seat comprising a radial outer chamber with an axial dimension which is substantially equal to the diameter of said wire and a radial inner chamber having an axial dimension which is greater than the diameter of said wire.

8. A coupling for a metal tube, in particular for a tube for protecting electrical systems, said coupling comprising:

a metal body defining a cavity having a circular cross-section with a diameter adapted to receive an end of said tube;

a seat, defined in said metal body, having a radial outer chamber with two radial abutment surfaces facing each other and a radial inner chamber; and an electrically-conductive resilient member having a substantially spiral configuration including an outer arm which is clamped between said two radial abutment surfaces and an inner arm which is radially movable between an undeformed configuration and a deformed configuration, wherein the inner arm has an inner diameter which, in said undeformed configuration, is less than the diameter of said cavity and, in said deformed configuration, is substantially equal to the diameter of said cavity;

wherein said radial inner chamber is located in correspondence with the inner arm of the electrically-conductive resilient member and said radial inner chamber has an axial dimension which is greater than the thickness of the electrically-conductive resilient member.

9. A coupling according to claim 8, wherein the resilient member is formed from a circular-section wire which, in said undeformed configuration, projects radially into said cavity by an amount less than the diameter of the circular-section wire.

10. A coupling according to claim 8, wherein said seat is defined between two metal rings fixed to said body, each of said rings having one of said abutment surfaces.

* * * * *

UNITED STATES PATENT AND TRADEMARK OFFICE
CERTIFICATE OF CORRECTION

PATENT NO. : 5,792,990
DATED : August 11, 1998
INVENTOR(S) : Piero Bertoldo

It is certified that error appears in the above-identified patent and that said Letters Patent is hereby corrected as shown below:

On the title page, item [19], change "Piero" to --Bertoldo--; and item [75], change "Bertoldo Piero" to --Piero Bertoldo--.

Signed and Sealed this

Second Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,792,990
DATED : August 11, 1998
INVENTOR(S) : Piero

It is certified that error appears in the above-identified patent and that said Letters Patent is hereby corrected as shown below:

On the title page, item[30]:

Change " Apr. 3,1992" to --Apr. 30,1992--.

Signed and Sealed this

Twenty-seventh Day of July, 1999

Attest:

Q. TODD DICKINSON

Attesting Officer

Acting Commissioner of Patents and Trademarks